(12) United States Patent
Chen

(10) Patent No.: US 10,846,513 B2
(45) Date of Patent: Nov. 24, 2020

(54) METHOD, DEVICE AND STORAGE MEDIUM FOR PROCESSING PICTURE

(71) Applicant: Beijing Xiaomi Mobile Software Co., Ltd., Bejing (CN)

(72) Inventor: Zhijun Chen, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 83 days.

(21) Appl. No.: 16/038,352

(22) Filed: Jul. 18, 2018

(65) Prior Publication Data
US 2019/0042830 A1 Feb. 7, 2019

(30) Foreign Application Priority Data
Aug. 3, 2017 (CN) .......................... 2017 1 0657820

(51) Int. Cl.
G06K 9/00 (2006.01)
G06T 5/50 (2006.01)
G06T 5/00 (2006.01)
G06K 9/46 (2006.01)

(52) U.S. Cl.
CPC ..... G06K 9/00248 (2013.01); G06K 9/00255 (2013.01); G06K 9/00268 (2013.01); G06K 9/46 (2013.01); G06T 5/001 (2013.01); G06T 5/50 (2013.01); G06T 2207/10004 (2013.01)

(58) Field of Classification Search
CPC ........... G06K 9/00248; G06K 9/00255; G06K 9/00268; G06K 9/46; G06T 5/001; G06T 5/50
See application file for complete search history.

(56) References Cited

U.S. PATENT DOCUMENTS

| 2006/0244845 | A1 | 11/2006 | Craig |
| 2011/0019026 | A1* | 1/2011 | Kameyama ............... G06K 9/42 |
| | | | 348/222.1 |
| 2012/0155759 | A1 | 6/2012 | Kang |
| 2013/0201211 | A1* | 8/2013 | Kim ........................ H04L 51/10 |
| | | | 345/632 |

(Continued)

FOREIGN PATENT DOCUMENTS

| CN | 104346136 A | 2/2015 |
| CN | 104715236 A | 6/2015 |

(Continued)

OTHER PUBLICATIONS

Extended European search report of European Patent Application No. 18186704.5, from the European Patent office, dated Jan. 4, 2019, 9 pages.

(Continued)

*Primary Examiner* — Md K Talukder
(74) *Attorney, Agent, or Firm* — Arch & Lake LLP

(57) ABSTRACT

The present disclosure relates to a method, a device and a storage medium for processing a picture, which pertains to the field of data processing. The method includes: acquiring a processed first picture and a second picture to be processed; acquiring processing information for processing the first picture, where the processing information includes a processing mode and a processing parameter for processing; and processing the second picture according to the processing information to obtain a third picture.

17 Claims, 9 Drawing Sheets

```
┌─────────────────────────────────────────────────┐  ┌─ 101
│ ACQUIRING A PROCESSED FIRST PICTURE AND A SECOND│
│              PICTURE TO BE PROCESSED            │
└─────────────────────────────────────────────────┘
                        ▼
┌─────────────────────────────────────────────────┐  ┌─ 102
│ ACQUIRING PROCESSING INFORMATION FOR PROCESSING │
│   THE FIRST PICTURE, THE PROCESSING INFORMATION │
│   INCLUDING A PROCESSING MODE AND A PROCESSING  │
│    PARAMETER FOR PROCESSING THE FIRST PICTURE   │
└─────────────────────────────────────────────────┘
                        ▼
┌─────────────────────────────────────────────────┐  ┌─ 103
│   PROCESSING THE SECOND PICTURE ACCORDING TO THE│
│  PROCESSING INFORMATION TO OBTAIN A THIRD PICTURE│
└─────────────────────────────────────────────────┘
```

(56) References Cited

U.S. PATENT DOCUMENTS

| | | | | |
|---|---|---|---|---|
| 2014/0282086 A1* | 9/2014 | Shi | ............... | G06F 3/04886 |
| | | | | 715/752 |
| 2016/0035074 A1* | 2/2016 | Jeong | ............... | G06T 3/40 |
| | | | | 382/282 |
| 2016/0350074 A1* | 12/2016 | Choi | ............... | G06F 9/30014 |
| 2017/0186173 A1* | 6/2017 | Hakamada | ............... | G06T 5/50 |
| 2017/0287127 A1* | 10/2017 | Chung | ............... | G06T 11/60 |
| 2019/0042830 A1* | 2/2019 | Chen | ............... | G06K 9/46 |
| 2019/0139207 A1* | 5/2019 | Jeong | ............... | G06T 11/60 |

FOREIGN PATENT DOCUMENTS

| | | |
|---|---|---|
| CN | 105096241 A | 11/2015 |
| CN | 105303523 A | 2/2016 |
| CN | 105320428 A | 2/2016 |
| CN | 106780401 A | 5/2017 |
| CN | 106940880 A | 7/2017 |
| EP | 2980758 A2 | 2/2016 |

OTHER PUBLICATIONS

Chinese Office Action (including English translation) issued in CN201710657820.1, dated Apr. 7, 2020, 22 pages.

* cited by examiner

| GENERAL | SECURITY | DETAILS | PREVIOUS VERSIONS |

| ATTRIBUTE | VALUE |
|---|---|
| IMAGE | |
| IMAGE ID | |
| SIZE | 640 X 512 |
| WIDTH | 640 PIXEL |
| HEIGHT | 512 PIXEL |
| HORIZONTAL RESOLUTION | 72 dpi |
| VERTICAL RESOLUTION | 72 dpi |
| BIT DEPTH | 24 |
| COMPRESSION | |
| RESOLUTION UNIT | 2 |
| COLOR REPRESENTATION | sRGB |
| COMPRESSED BIT/PIXEL | |
| CAMERA | |
| CAMERA MANUFACTURE | FLIR1 |
| CAMERA MODEL | |
| APERTURE VALUE | |
| EXPOSURE TIME | |

Fig. 2-4

METHOD, DEVICE AND STORAGE MEDIUM FOR PROCESSING PICTURE

CROSS-REFERENCE TO RELATED APPLICATION

This application is based upon and claims priority to Chinese patent application No. 201710657820.1 filed Aug. 3, 2017, the entire content of which is incorporated herein by reference in its entirety for all purposes.

TECHNICAL FIELD

The present disclosure relates to the field of data processing, and more particularly, to a method, a device and a storage medium for processing a picture.

BACKGROUND

Users may process pictures. For example, when a user takes a picture, the user may perform a beauty treatment on the picture with a terminal.

When performing a beauty treatment on a picture, the user may need to set a beauty treatment mode and a beauty treatment parameter. The beauty treatment mode may be dermabrasion, whitening, face-lifting, eye enlarging or other treatment modes. The beauty treatment parameter may be a degree of dermabrasion, a degree of whitening, a degree of face-lifting, a degree of eye enlarging or the like. The terminal may perform the beauty treatment on the picture according to the beauty treatment mode and the beauty treatment parameter.

SUMMARY

The examples of the present disclosure provide a method, a device and a non-transitory computer readable storage medium for processing a picture.

According to a first aspect of the present disclosure, a method for processing a picture is provided. The method may include: acquiring a first picture and a second picture, where the first picture is obtained from processing a first original picture by using processing information and the second picture is to be processed; acquiring the processing information from the first picture, where the processing information may include at least a processing mode and a processing parameter; and processing the second picture using the processing information to obtain a third picture According to a second aspect of the present disclosure, a device for processing a picture is provided. The device may include: a processor; and a memory for storing instructions executable by the processor; where the processor may be configured to: acquire a first picture and a second picture, where the first picture is obtained from processing a first original picture by using processing information and the second picture is to be processed; acquire the processing information from the first picture, where the processing information may include at least a processing mode and a processing parameter; and process the second picture using the processing information to obtain a third picture.

According to a third aspect of the present disclosure, a non-transitory computer readable storage medium is provided. The non-transitory computer readable storage medium may store instructions, and when the instructions are executed by a device may cause the device to perform: acquiring a first picture and a second picture, where the first picture is obtained from processing a first original picture by using processing information and the second picture is to be processed; acquiring the processing information from the first picture, where the processing information may include at least a processing mode and a processing parameter; and processing the second picture using the processing information to obtain a third picture.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate examples consistent with the disclosure and, together with the description, serve to explain the principles of the disclosure.

FIG. 2-1 is a flowchart illustrating a method for processing a picture according to another example;

FIG. 2-2 is a schematic diagram showing an overlapping positional relationship between a first picture and a second picture according to an example;

FIG. 2-3 is a schematic diagram showing an aligning positional relationship between a first picture and a second picture according to an example;

FIG. 2-4 is a schematic diagram showing attribute fields of a picture according to an example;

FIG. 3-1 is a block diagram illustrating a device for processing a picture according to an example;

FIG. 3-2 is a block diagram illustrating another device for processing a picture according to an example;

FIG. 3-3 is a block diagram illustrating another device for processing a picture according to an example; and FIG. 4 is a block diagram illustrating a device for processing a picture according to another example.

Through the above drawings, an explicit example of the present disclosure has been shown and will be described in more detail later. These drawings and textual descriptions are not intended to limit the scope of the inventive concept in any way, but rather to explain to one of ordinary skill in the art the concepts of the present disclosure with reference to specific examples.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the disclosure. Instead, they are merely examples of apparatuses and methods consistent with aspects related to the disclosure as recited in the appended claims.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Figure 1:
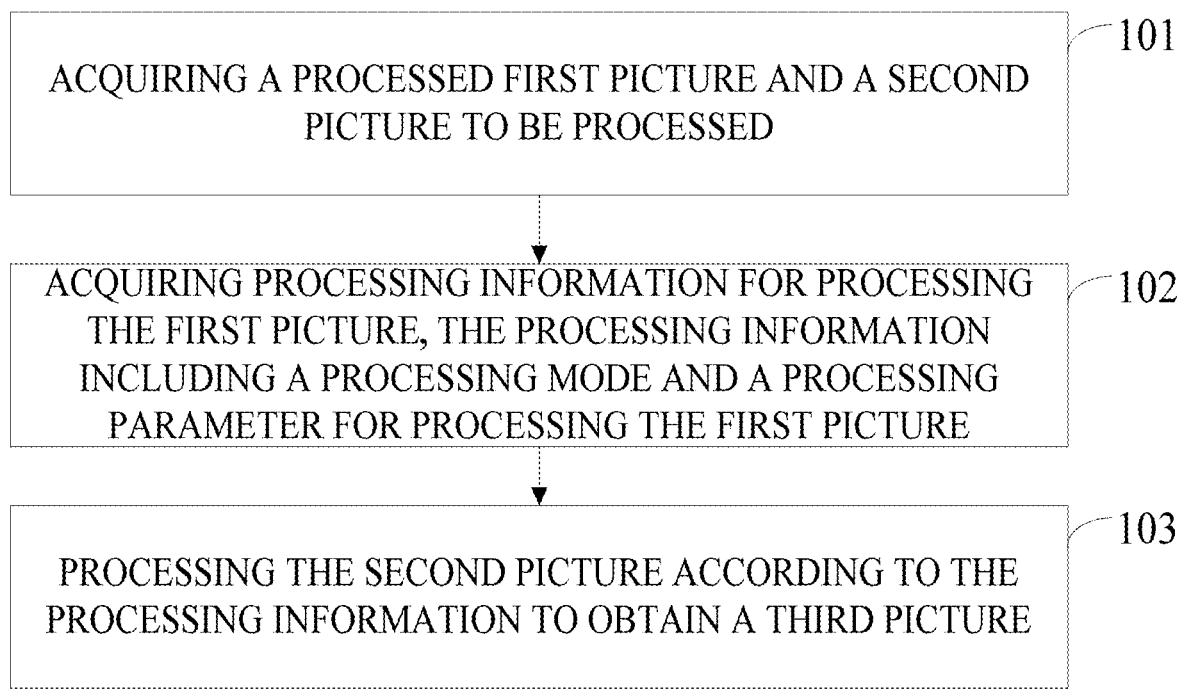
FIG. 1 is a flowchart illustrating a method for processing a picture according to an example.

Referring to FIG. 1, an example of the present disclosure provides a method for processing a picture. The method of the example is performed by a terminal, which may be a mobile phone, a tablet, a notebook, a desktop, or the like. The method includes the following steps.

In step 101, a processed first picture and a second picture to be processed are acquired.

In step 102, processing information for processing the first picture is acquired, and the processing information may include a processing mode and a processing parameter for processing the first picture.

In step 103, the second picture is processed according to the processing information to obtain a third picture.

In the example of the present disclosure, a processed first picture and a to-be-processed second picture are acquired; processing information for processing the first picture is acquired; and the second picture is processed according to the processing information to obtain a third picture. Compared with user manually setting processing information, the time required for acquiring the processing information can be reduced, and the efficiency of processing the picture can be improved.

Figures 1, 2:
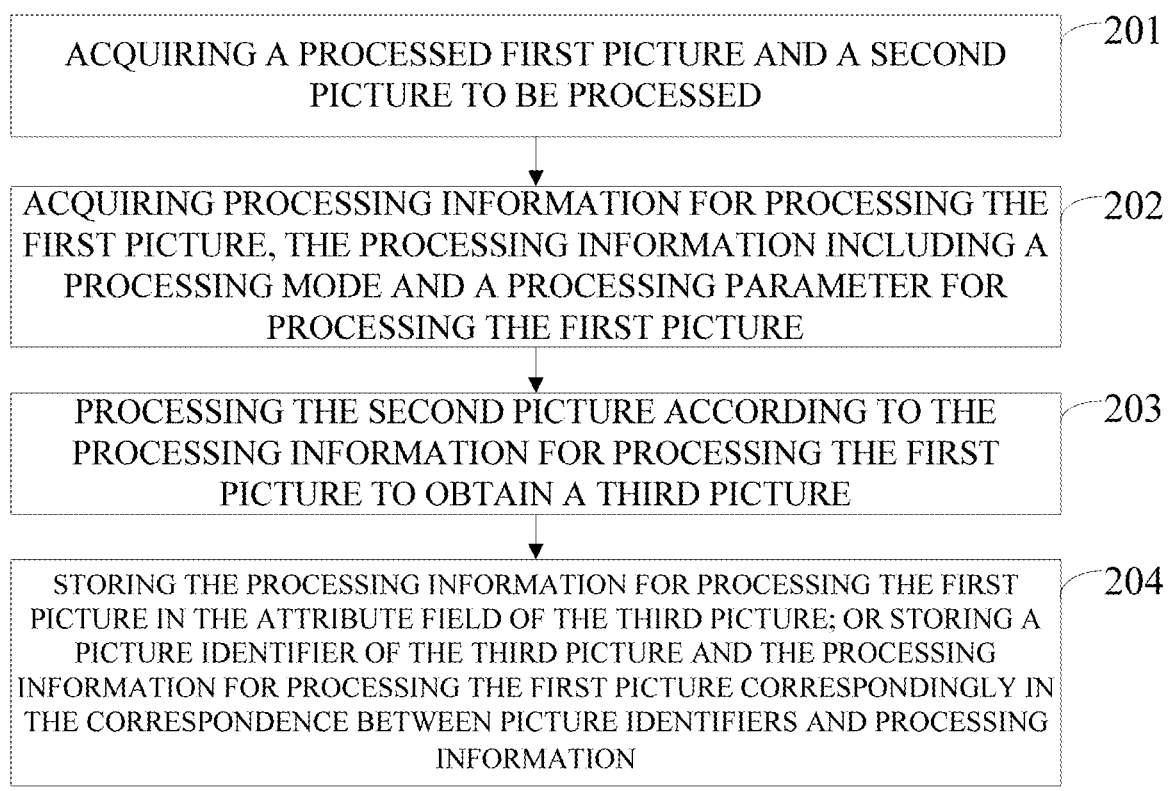
Figure 2:
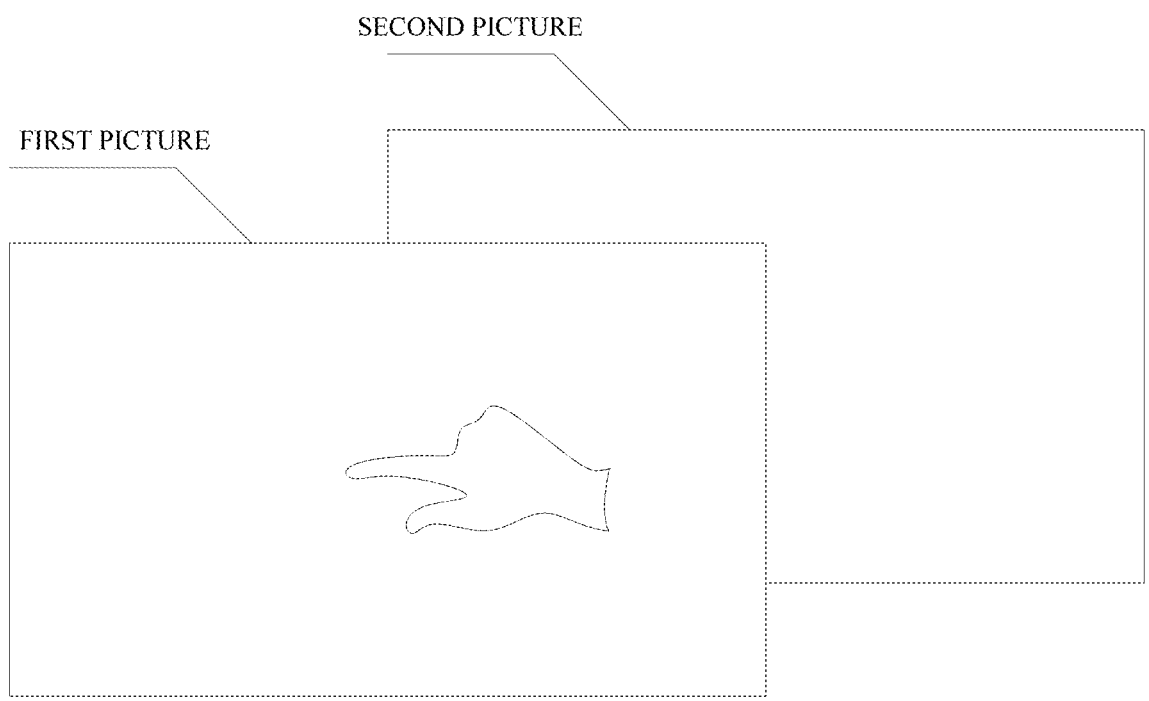

Referring to FIG. 2, an example of the present disclosure provides a method for processing a picture. The method of the example is performed by a terminal, which may be a mobile phone, a tablet, a notebook, a desktop, or the like. The method includes the following steps.

In step 201, a processed first picture and a second picture to be processed are acquired.

This example may be applied to a scenario in which a user needs to process a second picture. An operation for processing the second picture may be to modify an image in the second picture, perform an operation such as filtering or editing on the second picture. The operation of modifying the image in the second picture may be to increase or decrease the whiteness of the human body image in the second picture, to modify the edge of the face image in the second picture, or to increase or decrease the size of the eye image in the second picture, and so on.

There are multiple implementation manners for this step, and the following three implementation manners are listed in the examples of the present disclosure. Other implementation manners will not be listed in the examples of the present disclosure. The three implementations are as follows.

First, when a first selection operation on the first picture and a second selection operation on the second picture are detected, the first picture corresponding to the first selection operation and the second picture corresponding to the second selection operation are acquired.

The first selection operation and the second selection operation may both be click operations.

This implementation manner may be applied to a scenario in which a user finds that a processed first picture has a desirable processing effect and the user wants to perform the same processing on the second picture as the first picture. In this scenario, the user can click the first picture and the second picture. Correspondingly, when detecting the click operation on the first picture and the click operation on the second picture, the terminal acquires the first picture and the second picture.

In practical implementation, the user may click the first picture first. When the terminal detects the click operation on the first picture, a trigger button may be displayed. The user may click the trigger button and then click the second picture. When detecting the click operation on the trigger button, the terminal acquires the first picture, and when detecting the click operation on the second picture, the terminal acquires the second picture.

Alternatively, in practical implementation, the user may click the second picture first. When the terminal detects the click operation on the second picture, a trigger button is displayed. The user may click the trigger button and then click the first picture. When detecting the click operation on the trigger button, the terminal acquires the second picture, and when detecting the click operation on the first picture, the terminal acquires the first picture.

The first picture may be a picture processed by the user himself or a processed picture shared by a friend of the user, and so on. For example, a friend of the user may share a picture processed by the friend in Friend Circle, the user sees the picture in the Friend Circle, and may perform a click operation to select the picture.

Second, when it is detected that the position between the first picture and the second picture satisfies a preset positional relationship, the first picture and the second picture are acquired.

The preset positional relationship may be of many kinds. For example, the preset positional relationship may be that two pictures are overlapped and the distance between the centers of the two pictures does not exceed a preset distance threshold, or that the side of one of the pictures is aligned with the side of another of the pictures, and so on. Next, the following two examples are given to illustrate the implementation manner in detail, and other examples except the two examples will be omitted in this example.

In a first example, when it is detected that the first picture overlaps with the second picture and the distance between the center of the first picture and the center of the second picture does not exceed the preset distance threshold, it is determined that the second picture needs to be processed, and the first picture and second picture are acquired.

Referring to FIG. 2-2, in the first example, the user can drag the first picture to the top of the second picture, and continue to drag the first picture to move the center of the first picture closer to the center of the second picture.

When the user drags the first picture, the terminal acquires the distance between the center of the first picture and the center of the second picture in real time. When the acquired distance is less than or equal to the preset distance threshold, the terminal determines that the second picture needs to be processed, and acquires the first picture and the second picture.

Alternatively, the user can drag the second picture, to the top of the first picture, and continue to drag the second picture to move the center of the second picture closer to the center of the first picture.

When the user drags the second picture, the terminal acquires the distance between the center of the first picture and the center of the second picture in real time. When the acquired distance is less than or equal to the preset distance threshold, the terminal determines that the second picture needs to be processed, and acquires the first picture and the second picture.

In a second example, when it is detected that one side of the first picture is aligned with one side of the second picture, it is determined that the second picture needs to be processed, and the first picture and the second picture are acquired.

Figures 2, 3:
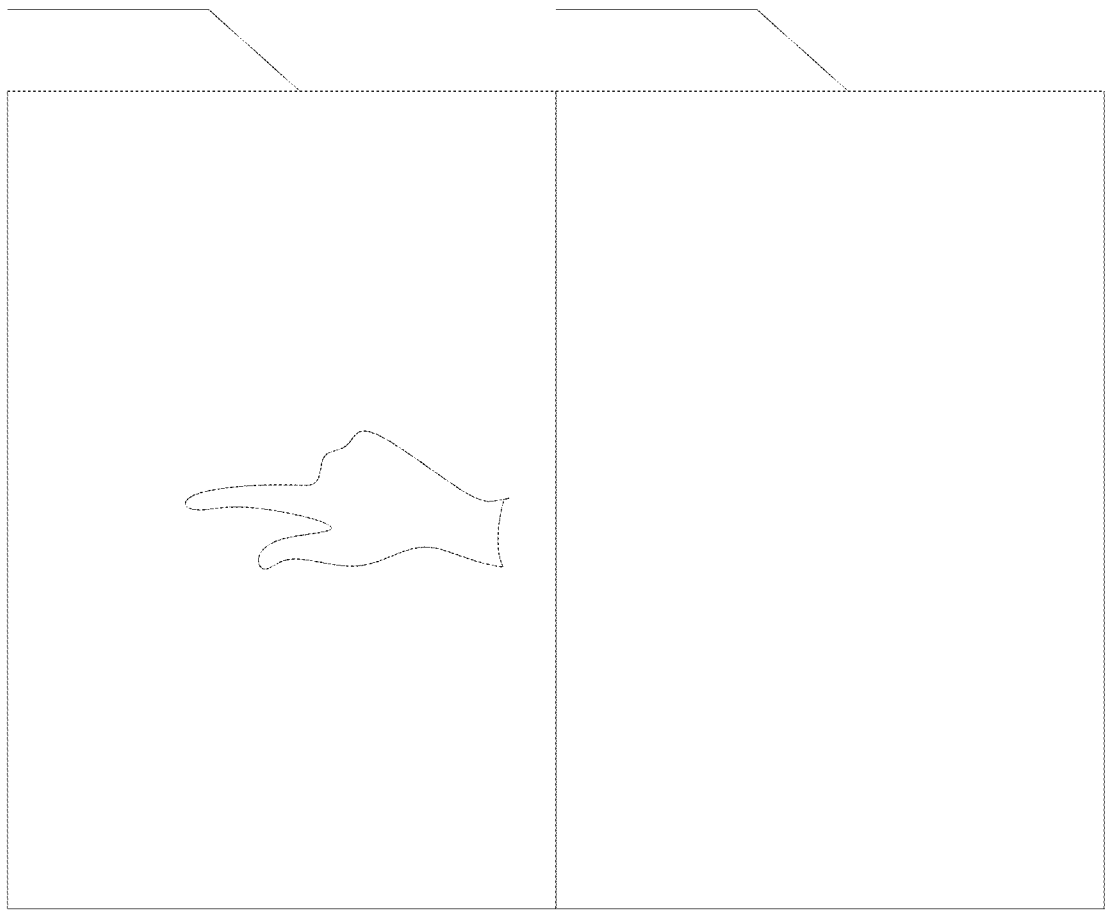
Figures 1, 3:
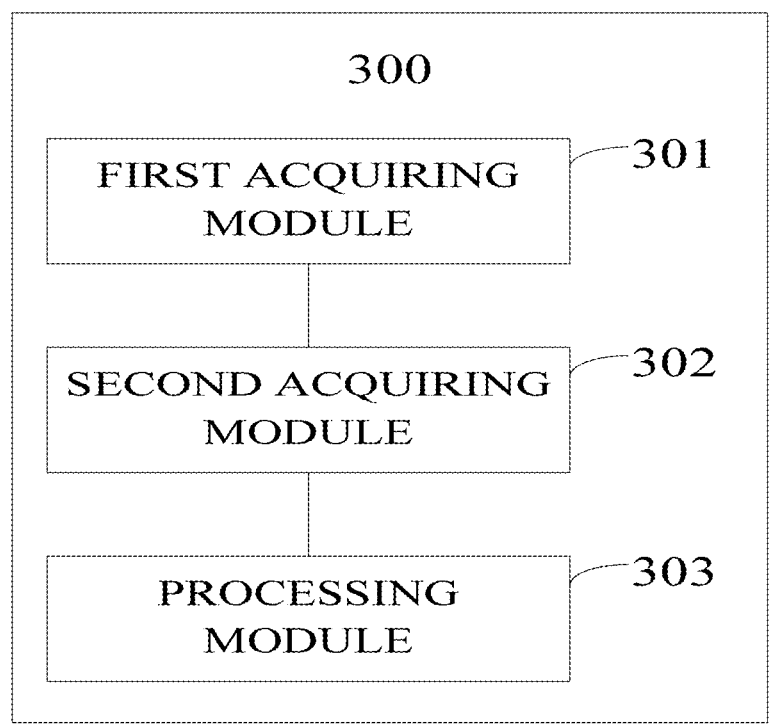
Figures 2, 3:
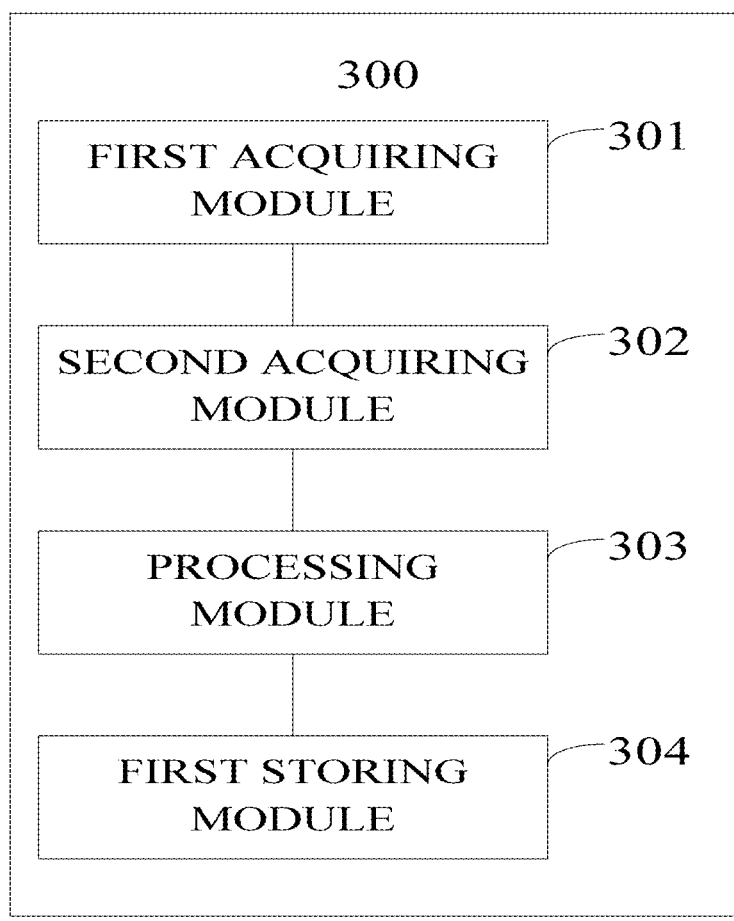
Figure 3:
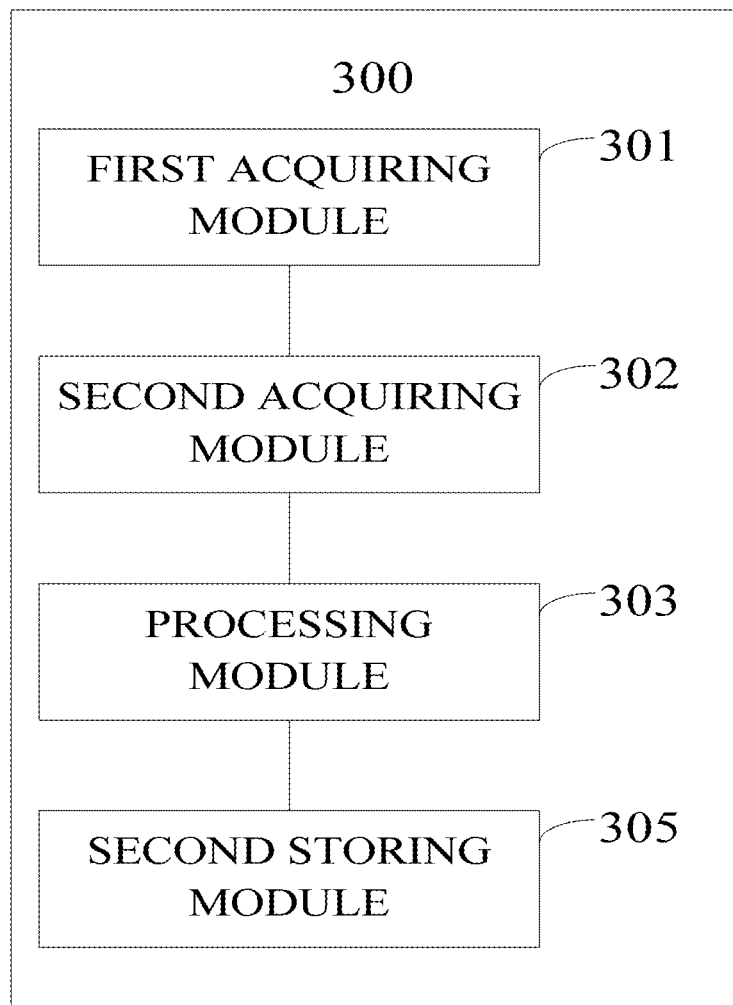

Referring to FIG. 2-3, in the second example, the user may drag the first picture to move the first picture toward the second picture, until one side of the first picture is aligned with one side of the second picture. When the user drags the first picture, the user may make the side of the first picture in parallel to the lengthwise direction of the first picture align with the side of the second picture in parallel to the lengthwise direction of the second picture. Alternatively, the user may make the side of the first picture in parallel to the widthwise direction of the first picture align with the side of the second picture in parallel to the widthwise direction of the second picture.

When the user drags the first picture, the first picture and the second picture are detected in real time. When it is detected that one side of the first picture is aligned with one side of the second picture, it is determined that the second picture needs to be processed, and the first picture and the second picture are acquired.

Alternatively, the user may drag the second picture to move the second picture toward the first picture, until one side of the second picture is aligned with one side of the first picture. When the user drags the second picture, the user may make the side of the first picture in parallel to the lengthwise direction of the first picture align with the side of the second picture in parallel to the lengthwise direction of the second picture. Alternatively, the user may make the side of the first picture in parallel to the widthwise direction of the first picture align with the side of the second picture in parallel to the widthwise direction of the second picture.

When the user drags the second picture, the first picture and the second picture are detected in real time. When it is detected that one side of the first picture is aligned with one side of the second picture, it is determined that the second picture needs to be processed, and the first picture and the second picture are acquired.

Third, a second picture to be processed is acquired. At least one picture containing a face image with the same face shape as the face shape of the face image included in the second picture is acquired from processed pictures stored in the server, and one picture is selected from the at least one picture as the first picture.

In practical implementation, when the user needs to process the second picture, the second picture may be selected. Correspondingly, the terminal acquires the selected second picture, and recognizes the face image in the second picture by utilizing face recognition technology, to obtain the face shape of the face image. The face shape of the face image may be heart-shaped face, a square face, or a round face, and others. Then, a request message carrying the face shape is sent to the server.

The server receives the request message, acquires at least one corresponding picture from the correspondence between pictures and face shapes according to the face shape carried in the request message, and sends the at least one picture to the terminal. Each picture stored in the correspondence between pictures and face shapes is an image that has already been processed.

The terminal receives the at least one picture sent by the server and displays the at least one picture for the user to select a picture from the at least one picture. The selected picture is acquired as the first picture.

In step 202, processing information for processing the first picture is acquired, and the processing information includes a processing mode and a processing parameter for processing the first picture.

The parameter may include a processing degree for processing the first picture or a processing result obtained after the first picture is processed.

Assuming that the operation of processing the first picture is to increase or decrease the whiteness of the human body image in the first picture, the processing mode included in the processing information is to increase or decrease the whiteness of the human body image, and the processing parameter included in the processing information, i.e., the processing degree, may be the degree to which the whiteness of the human body image is increased or decreased. Alternatively, the processing parameter included in the processing information, i.e., the processing result, may be the resulted whiteness of the human body image after the increase or decrease.

For another example, assuming that the operation of processing the first picture is to increase or decrease the size of the eye image in the first picture, the processing mode included in the processing information is to increase or decrease the size of the eye image, and the processing parameter included in the processing information, i.e., the processing degree, may be the degree to which the size of the eye image is increased or decreased. Alternatively, the processing parameter included in the processing information, i.e., the processing result, may be the resulted size of the eye image after the increase or decrease.

In this step, the processing information for processing the first picture may be acquired in the following two manners, respectively.

First, the processing information for processing the first picture is extracted from an attribute field of the first picture.

The first picture may include at least one attribute field, each of which includes at least one subfield. The processing information for processing the first picture may be stored in the subfield included in a certain attribute field in the at least one attribute field.

Figure 4:
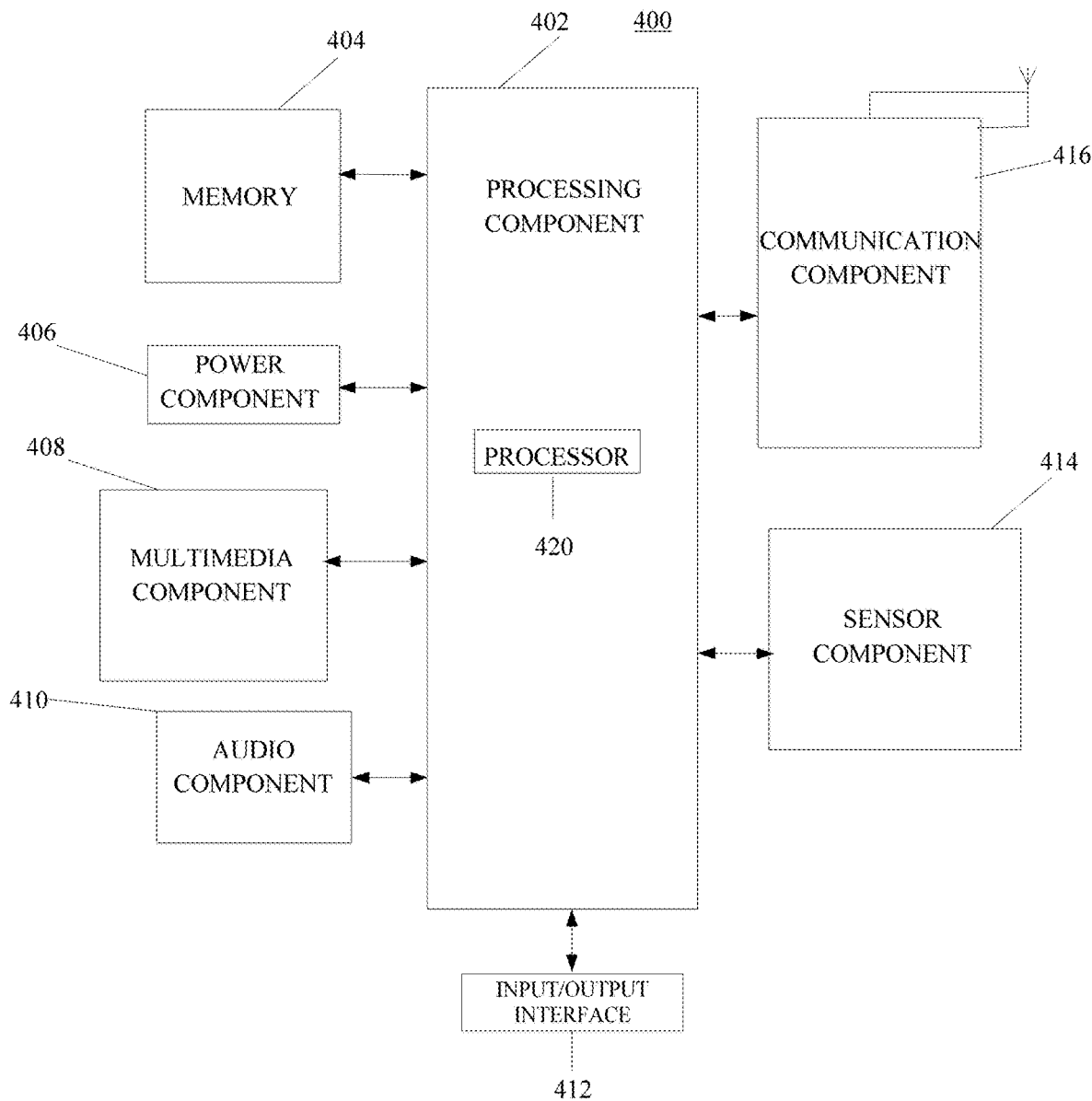

For example, referring to the attribute fields of the first picture shown in FIG. 2-4, the first picture may include attribute fields such as "General", "Security", "Details (exif Information)" and "Previous Versions", etc. Among them, the attribute field "Details" includes subfields such as "Image ID", "Size" and "Width", etc.

Optionally, the subfields included in the attribute field "Details" may be used to store the processing information for processing the first picture. In practical implementation, at least one subfield may be newly added to the attribute field "Details", and the newly added at least one subfield may be used to store the processing information for processing the first picture. Alternatively, at least one subfield is selected from the attribute field "Details", and the selected at least one subfield may be used to store the processing information for processing the first picture.

Optionally, a blank subfield may be selected in the attribute field "Details" for storing the processing information for processing the first picture. For example, the subfield "Image ID", "Compression", "Compressed Bits/Pixels", "Camera Model", "Aperture Value", "Exposure Time" are included in the "Details" shown in FIG. 2-4. Each of these subfields is a blank subfield, and at least one of the blank subfields may be selected for storing the processing information for processing the first picture.

Second, according to the picture identifier of the first picture, the processing information for processing the first picture is acquired from the correspondence between picture identifiers and processing information.

The correspondence between picture identifiers and processing information may be stored locally in the terminal or be stored in the server.

In an implementation, after the terminal processes the picture, the terminal may store the picture identifier of the picture and the processing information for processing the picture in the locally stored correspondence between picture identifiers and processing information. Alternatively, the terminal may send a storing request message to the server, and the storing request message carries a picture identifier of the picture and processing information for processing the picture. After receiving the storing request message, the server stores the picture identifier of the picture and processing information carried in the storing request message correspondingly in the locally stored correspondence between picture identifiers and processing information.

In an implementation of the second manner, the correspondence between picture identifiers and processing information is stored locally in the terminal. The terminal acquires the picture identifier of the first picture, and according to the picture identifier of the first picture, acquires the processing information for processing the first picture from the locally stored correspondence between picture identifiers and processing information.

When the correspondence between picture identifiers and processing information is stored in the server, the terminal acquires the picture identifier of the first picture, and sends a request message carrying the picture identifier of the first picture to the server. The server receives the request message, and according to the picture identifier of the first picture carried in the request message, acquires the processing information for processing the first picture from the locally stored correspondence between picture identifiers and processing information, and sends a response message carrying the processing information for processing the first picture to the terminal. The terminal receives the response message, and extracts the processing information for processing the first picture from the response message.

Optionally, the operation of the terminal acquiring the picture identifier of the first picture may be as follows.

The terminal extracts the picture identifier of the first picture from the attribute field of the first picture. For example, a subfield "Image ID" is included in the attribute field "Details" shown in FIG. 2-4. The subfield is used for storing a picture identifier of the first picture. When the subfield is not a blank field, the picture identifier of the first picture may be extracted from the subfield.

Alternatively, the terminal acquires the picture identifier of the first picture according to the picture content of the first picture. For example, MD5 (Message Digest Algorithm MD5) may be performed on the first picture to calculate the MD5 value, and the MD5 value may be used as the picture identifier of the first picture. Alternatively, the first picture may be hashed to obtain a hash value, and the hash value is used as the picture identifier of the first picture.

In step 203, the second picture is processed according to the processing information for processing the first picture to obtain a third picture.

The processing information for processing the first picture includes a processing mode and a processing parameter. The processing parameter may include a processing degree or a processing result.

This step may be as follows: according to the processing degree, a processing operation corresponding to the processing mode is performed on the second picture.

Alternatively, the second picture is processed according to the processing result and the processing mode, such that the processing result of the second picture after the processing is the same as the processing result.

Optionally, for the operation of processing the second picture according to the processing result and the processing mode, the implementation process may be as follows.

A parameter type for processing the second picture is determined according to the processing mode. A parameter of the parameter type for the human body image in the second picture is acquired. The parameter is compared with the processing result. If the parameter is greater than the processing result, the parameter of the human body image in the second picture is decreased according to the processing result. If the parameter is smaller than the processing result, the parameter of the human body image in the second picture is increased according to the processing result.

For example, assuming that the processing mode included in the processing information for processing the first picture is to increase or decrease the whiteness of the human body image, and the processing degree is the degree to which the whiteness of the human body image is increased or decreased.

According to the processing degree, performing a processing operation corresponding to the processing mode on the second picture may be as follows.

The whiteness of the human body image in the second picture is increased according to the degree for increasing the whiteness, to obtain the third picture, or the whiteness of the human body image in the second picture is decreased according to the degree for decreasing the whiteness, to obtain the third picture.

Alternatively, assuming that the processing mode included in the processing information for processing the first picture is also to increase or decrease the whiteness of the human body image, and the processing result is the whiteness of the human body image in the first picture.

The operation of processing the second picture according to the processing result and the processing mode may be as follows.

When the processing mode is to increase the whiteness of the human body image, it is determined that the parameter type for processing the second picture is whiteness. The whiteness of the human body image in the second picture is acquired, and the whiteness of the human body image in the second picture is compared with the whiteness in the processing result. If the whiteness of the human body image in the second picture is smaller than the whiteness in the processing result, the whiteness of the human body image in the second picture is increased according to the whiteness in the processing result, and if the whiteness of the human body image in the second picture is greater than or equal to the whiteness in the processing result, no operation is performed.

Optionally, the operation may further include: if the whiteness of the human body image in the second picture is greater than the whiteness in the processing result, the whiteness of the human body image in the second picture may also be decreased according to the whiteness in the processing result. In this way, it can ensure that the whiteness of the human body image in the first picture is consistent with the whiteness of the human body image in the second picture.

In an implementation, if the whiteness of the human body image in the second picture is greater than the whiteness in the processing result, the terminal displays a prompt box that includes prompt information, a confirmation button and a cancel button. The prompt information is used to prompt the situation for the user and inquire whether the user continues to perform the operation. If the user wishes to continue the operation, the user may click the confirmation button; otherwise, the user may click the cancel button. When the terminal detects a click operation on the confirmation button, the terminal decreases the whiteness of the human body image in the second picture according to the whiteness in the processing result. When the terminal detects a click operation on the cancel button, the operation is ended.

Alternatively, the operation of processing the second picture according to the processing result and the processing mode may be as follows.

When the processing mode is to decrease the whiteness of the human body image, it is determined that the parameter type for processing the second picture is whiteness. The whiteness of the human body image in the second picture is acquired, and the whiteness of the human body image in the second picture is compared with the whiteness in the processing result. If the whiteness of the human body image in the second picture is greater than the whiteness in the processing result, the whiteness of the human body image in the second picture is decreased according to the whiteness in the processing result, and if the whiteness of the human body image in the second picture is smaller than or equal to the whiteness in the processing result, no operation is performed.

Optionally, the operation may further include: if the whiteness of the human body image in the second picture is smaller than the whiteness in the processing result, the whiteness of the human body image in the second picture may also be increased according to the whiteness in the processing result. In this way, it can ensure that the whiteness of the human body image in the first picture is consistent with the whiteness of the human body image in the second picture.

In an implementation, if the whiteness of the human body image in the second picture is smaller than the whiteness in the processing result, the terminal displays a prompt box that includes prompt information, a confirmation button and a cancel button. The prompt information is used to prompt the situation for the user and inquire whether the user continues to perform the operation. If the user wishes to continue the operation, the user may click the confirmation button; otherwise, the user may click the cancel button. When the terminal detects a click operation on the confirmation button, the terminal increases the whiteness of the human body image in the second picture according to the whiteness in the processing result. When the terminal detects a click operation on the cancel button, the operation is ended.

For another example, assuming that that the processing mode included in the processing information for processing the first picture is to increase or decrease the size of the eye image, and the processing degree is the degree to which the size of the eye image is increased or decreased.

According to the processing degree, performing a processing operation corresponding to the processing mode on the second picture may be as follows.

The size of the eye image in the second picture is increased according to the increasing degree, to obtain the third picture, or the size of the eye image in the second picture is decreased according to the decreasing degree, to obtain the third picture.

Alternatively, assuming that the processing mode included in the processing information for processing the first picture is also to increase or decrease the size of the eye image, and the processing result is the size of the eye image in the first picture.

The operation of processing the second picture according to the processing result and the processing mode may be as follows.

When the processing mode is to increase the size of the eye image, it is determined that the parameter type for processing the second picture is the size of the eye image. The size of the eye image in the second picture is acquired, and the size of the eye image in the second picture is compared with the size of the eye image in the processing result. If the size of the eye image in the second picture is smaller than the size of the eye image in the processing result, the size of the eye image in the second picture is increased according to the size of the eye image in the processing result, and if the size of the eye image in the second picture is greater than or equal to the size of the eye image in the processing result, no operation is performed.

Optionally, the operation may further include: if the size of the eye image in the second picture is greater than the size of the eye image in the processing result, the size of the eye image in the second picture may also be decreased according to the size of the eye image in the processing result. In this way, it can ensure that the size of the eye image in the first picture is consistent with the size of the eye image in the second picture.

In an implementation, if the size of the eye image in the second picture is greater than the size of the eye image in the processing result, the terminal displays a prompt box that includes prompt information, a confirmation button and a cancel button. The prompt information is used to prompt the situation for the user and inquire whether the user continues to perform the operation. If the user wishes to continue the operation, the user may click the confirmation button; otherwise, the user may click the cancel button. When the terminal detects a click operation on the confirmation button, the terminal decreases the size of the eye image in the second picture according to the size of the eye image in the processing result. When the terminal detects a click operation on the cancel button, the operation is ended.

Alternatively, the operation of processing the second picture according to the processing result and the processing mode may be as follows.

When the processing mode is to decrease the size of the eye image, it is determined that the parameter type for processing the second picture is size of the eye image. The size of the eye image in the second picture is acquired, and the size of the eye image in the second picture is compared with the size of the eye image in the processing result. If the size of the eye image in the second picture is greater than the size of the eye image in the processing result, the size of the eye image in the second picture is decreased according to the size of the eye image in the processing result, and if the size of the eye image in the second picture is smaller than or equal to the size of the eye image in the processing result, no operation is performed.

Optionally, the operation may further include: if the size of the eye image in the second picture is smaller than the size of the eye image in the processing result, the size of the eye image in the second picture may also be increased according to the size of the eye image in the processing result. In this way, it can ensure that the size of the eye image in the first picture is consistent with the size of the eye image in the second picture.

In an implementation, if the size of the eye image in the second picture is smaller than the size of the eye image in the processing result, the terminal displays a prompt box that includes prompt information, a confirmation button and a cancel button. The prompt information is used to prompt the situation for the user and inquire whether the user continues to perform the operation. If the user wishes to continue the operation, the user may click the confirmation button; otherwise, the user may click the cancel button. When the terminal detects a click operation on the confirmation button, the terminal increases the size of the eye image in the second picture according to the size of the eye image in the processing result. When the terminal detects a click operation on the cancel button, the operation is ended.

Optionally, the terminal may further correspondingly store the third picture and the face shape of the face image in the third picture in the correspondence between pictures and face shapes in the server. The implementation process is as follows.

The terminal acquires the face shape of the face image in the third picture, and sends to the server a storing request message carrying the third picture and the face shape. The server receives the storing request message, and stores the third picture and the face shape carried in the storing request message correspondingly in the correspondence between pictures and face shapes.

Alternatively, the terminal sends to the server a storing request message carrying the third picture. The server receives the storing request message, acquires the face shape of the face image in the third picture carried in the storing request message, and stores the third picture and the face shape correspondingly in the correspondence between pictures and face shapes.

Optionally, the terminal may also share the third picture. For example, the terminal may share the third picture in Friend Circle for the user.

In practical implementation, before sharing the third picture, the terminal displays a prompt box that includes prompt information, a confirmation button and a cancel button. The prompt information is used to inquire whether the user agrees to share the third picture. When the terminal detects a click operation on the confirmation button, the terminal shares the third picture. When the terminal detects a click operation on the cancel button, the terminal stops sharing the third picture.

In step 204, the processing information for processing the first picture is stored in the attribute field of the third picture. Alternatively, the picture identifier of the third picture and the processing information for processing the first picture are stored correspondingly in the correspondence between picture identifiers and processing information.

For the operation of storing the processing information for processing the first picture into the attribute field of the third picture, there are two implementation manners as follows.

First, at least one new subfield is added to the attribute field of the third picture, and processing information for processing the first picture is stored in the at least one new subfield.

For example, referring to FIG. 2-4, at least one subfield may be newly added in the attribute field "Details" of the third picture, and the newly added at least one subfield is used for storing the processing information for processing the first picture.

Second, at least one subfield is selected from the attribute field of the third picture, and the processing information for processing the first picture is stored in the at least one subfield.

For example, referring to FIG. 2-4, at least one subfield may be selected in the attribute field "Details" of the third picture, and the processing information for processing the first picture is stored in the at least one subfield.

Optionally, a blank subfield may be selected in the attribute field "Details" to store the processing information for processing the first picture.

For the operation of correspondingly storing the picture identifier of the third picture and the processing information for processing the first picture in the correspondence between picture identifiers and processing information, the correspondence between picture identifiers and processing information may be stored locally in the terminal, or stored in the server.

When the correspondence between picture identifiers and processing information is stored locally in the terminal, the terminal correspondingly stores the picture identifier of the third picture and the processing information for processing the first picture in the locally stored correspondence between picture identifiers and processing information.

When the correspondence between picture identifiers and processing information is stored in the server, the terminal acquires the picture identifier of the third picture, and sends a storing request message to the server, the storing request message carrying the picture identifier of the third picture and the processing information for processing the first picture. After receiving the storing request message, the server correspondingly stores the picture identifier and the processing information carried in the storing request message in the locally stored correspondence between picture identifiers and processing information.

Optionally, the operation of the terminal acquiring the picture identifier of the third picture may be as follows. The terminal extracts the picture identifier of the third picture from the attribute field of the third picture. For example, the picture identifier of the third picture is extracted from the subfield "picture ID" included in the attribute field "Details" of the third picture.

Alternatively, the terminal acquires the picture identifier of the third picture according to the picture content of the third picture. For example, MD5 (Message Digest Algorithm MD5) may be performed on the third picture to calculate the MD5 value, and the MD5 value may be used as the picture identifier of the third picture. Alternatively, the third picture may be hashed to obtain a hash value, and the hash value is used as the picture identifier of the third picture.

In an example of the present disclosure, a processed first picture and a second picture to be processed are acquired, processing information for processing the first picture is acquired, and the second picture is processed according to the processing information to obtain a third picture. Compared with user manually setting processing information, the time required for acquiring the processing information can be reduced, and the efficiency of processing the picture can be improved. In addition, the second picture is processed by utilizing the first picture which has desirable processing effect, it can make the processing effect of the second picture the same as the processing effect of the first picture, and it can bring about an improved user experience.

The following is a device example of the present disclosure and may be used to execute the method examples of the present disclosure. For details not disclosed in the device examples of the present disclosure, reference may be made to the method examples of the present disclosure.

FIG. 3-1 is a block diagram illustrating a device 300 for processing a picture according to an example. The device 300 is configured to perform the method for processing a picture provided by the example as shown in FIG. 1 or the example as shown in FIG. 2-1. The device 300 includes:

a first acquiring module 301 configured to acquire a processed first picture and a second picture to be processed;

a second acquiring module 302 configured to acquire processing information for processing the first picture, the processing information including a processing mode and a processing parameter for processing the first picture; and a processing module 303 configured to process the second picture according to the processing information to obtain a third picture.

Optionally, the second acquiring module 302 includes:

an extracting unit configured to extract the processing information for processing the first picture from an attribute field of the first picture; or a first acquiring unit configured to acquire the processing information for processing the first picture from a correspondence between picture identifiers and processing information, according to a picture identifier of the first picture.

Optionally, the first acquiring module 301 includes:

a second acquiring unit configured to determine to process the second picture and acquire the first picture and the second picture when detecting that a position between the first picture and the second picture satisfies a preset positional relationship; or a third acquiring unit configured to acquire the first picture corresponding to a first selection operation and the second picture corresponding to a second selection operation when detecting the first selection operation on the first picture and the second selection operation on the second picture.

Optionally, the first acquiring module 301 includes:

a fourth acquiring unit configured to acquire a second picture to be processed;

a fifth acquiring unit configured to acquire from processed pictures stored in a server, at least one picture containing a face image with the same face shape as the face shape of the face image included in the second picture; and a selecting unit configured to select one picture from the at least one picture as the first picture.

Optionally, the processing parameter includes a processing degree for processing the first picture or a processing result obtained after the first picture is processed.

Optionally, the processing module 303 includes:

a first process unit configured to perform a processing operation corresponding to the processing mode on the second picture, according to the processing degree; or a second process unit configured to process the second picture according to the processing result and the processing mode, such that the processing result of the second picture after the processing is the same as the processing result.

Optionally, as shown in FIG. 3-2, the device 300 further includes:

a first storing module 304 configured to store the processing information in the attribute field of the third picture.

Optionally, the first storing module 304 includes:

a first storing unit configured to add at least one new subfield to the attribute field of the third picture, and store the processing information for processing the first picture in the at least one new subfield; or a second storing unit configured to select at least one subfield from the attribute field of the third picture, and store the processing information for processing the first picture in the at least one subfield.

Optionally, as shown in FIG. 3-3, the device 300 further includes:

a second storing module 305 configured to store a picture identifier of the third picture and the processing information correspondingly in the correspondence between picture identifiers and processing information.

In the example of the present disclosure, a processed first picture and a to-be-processed second picture are acquired; processing information for processing the first picture is acquired; and the second picture is processed according to the processing information to obtain a third picture. Compared with user manually setting processing information, the time required for acquiring the processing information can be reduced, and the efficiency of processing the picture can be improved.

With respect to the device in the foregoing example, a specific manner in which each module performs an operation has been described in detail in the examples related to the method, and a detailed description of the specific manner will be omitted herein.

FIG. 4 is a block diagram illustrating a device 400 for processing a picture according to an example. The device 400 is configured to perform the method for processing a picture provided by the example as shown in FIG. 1 or the example as shown in FIG. 2-1. For example, the device 400 may be a mobile phone, a computer, a digital broadcast terminal, a messaging device, a gaming console, a tablet, a medical device, exercise equipment, a personal digital assistant, and the like.

Referring to FIG. 4, the device 400 can include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the device 400, such as the operations associated with display, telephone calls, data communications, camera operations, and recording operations. The processing component 402 can include one or more processors 420 to execute instructions to perform all or part of the steps in the above described methods. Moreover, the processing component 402 can include one or more modules which facilitate the interaction between the processing component 402 and other components. For instance, the processing component 402 can include a multimedia module to facilitate the interaction between the multimedia component 408 and the processing component 402.

The memory 404 is configured to store various types of data to support the operation of the device 400. Examples of such data include instructions for any applications or methods operated on the device 400, contact data, phonebook data, messages, pictures, video, etc. The memory 404 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the device 400. The power component 406 can include a power management system, one or more power sources, and any other components associated with the generation, management, and distribution of power in the device 400.

The multimedia component 408 includes a screen providing an output interface between the device 400 and the user. In some examples, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some examples, the multimedia component 408 includes a front camera and/or a rear camera. The front camera and/or the rear camera can receive an external multimedia datum while the device 400 is in an operation mode, such as a photographing mode or a video mode. Each of the front camera and the rear camera can be a fixed optical lens system or have focus and optical zoom capability.

The audio component 410 is configured to output and/or input audio signals. For example, the audio component 410 includes a microphone ("MIC") configured to receive an external audio signal when the device 400 is in an operation mode, such as a call mode, a recording mode, and a voice recognition mode. The received audio signal can be further stored in the memory 404 or transmitted via the communication component 416. In some examples, the audio component 410 further includes a speaker to output audio signals.

The I/O interface 412 provides an interface between the processing component 402 and peripheral interface modules, such as a keyboard, a click wheel, buttons, and the like. The buttons can include, but are not limited to, a home button, a volume button, a starting button, and a locking button.

The sensor component 414 includes one or more sensors to provide status assessments of various aspects of the device 400. For instance, the sensor component 414 can detect an open/closed status of the device 400, relative positioning of components, e.g., the display and the keypad of the device 400. The sensor component 414 can also detect a change in position of the device 400 or a component of the device 400, a presence or absence of user contact with the device 400, an orientation or an acceleration/deceleration of the device 400, and a change in temperature of the device 400. The sensor component 414 can include a proximity sensor configured to detect the presence of nearby objects without any physical contact. The sensor component 414 can also include a light sensor, such as a CMOS or CCD image sensor, for use in imaging applications. In some examples, the sensor component 414 can also include an accelerometer sensor, a gyroscope sensor, a magnetic sensor, a pressure sensor, or a temperature sensor.

The communication component 416 is configured to facilitate communication, wired or wirelessly, between the device 400 and other devices. The device 400 can access a wireless network based on a communication standard, such as WiFi, 2G, or 3G, or a combination thereof. In one example, the communication component 416 receives a broadcast signal or broadcast associated information from an external broadcast management system via a broadcast channel. In one example, the communication component 416 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In examples, the device 400 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In examples, there is also provided a non-transitory computer-readable storage medium including instructions, such as included in the memory 404, executable by the processor 420 in the device 400, for performing the above-described methods. For example, the non-transitory computer-readable storage medium can be a ROM, a RAM, a CD-ROM, a magnetic tape, a floppy disc, an optical data storage device, and the like.

A non-transitory computer-readable storage medium, when instructions in the storage medium are executed by a processor of the device 400, enables the device 400 to perform the method for processing a picture. The method includes:

acquiring a processed first picture and a second picture to be processed;

acquiring processing information for processing the first picture, the processing information including a processing mode and a processing parameter for processing the first picture; and processing the second picture according to the processing information to obtain a third picture.

Optionally, acquiring processing information for processing the first picture includes:

extracting the processing information for processing the first picture from an attribute field of the first picture; or acquiring the processing information for processing the first picture from a correspondence between picture identifiers and processing information, according to a picture identifier of the first picture.

Optionally, acquiring a processed first picture and a second picture to be processed includes:

determining to process the second picture and acquiring the first picture and the second picture when detecting that a position between the first picture and the second picture satisfies a preset positional relationship; or acquiring the first picture corresponding to a first selection operation and the second picture corresponding to a second selection operation when detecting the first selection operation on the first picture and the second selection operation on the second picture.

Optionally, acquiring a processed first picture and a second picture to be processed includes:

acquiring a second picture to be processed;

acquiring from processed pictures stored in a server, at least one picture containing a face image with the same face shape as the face shape of the face image included in the second picture; and selecting one picture from the at least one picture as the first picture.

Optionally, the processing parameter includes a processing degree for processing the first picture or a processing result obtained after the first picture is processed; and processing the second picture according to the processing information to obtain a third picture includes:

performing a processing operation corresponding to the processing mode on the second picture, according to the processing degree; or processing the second picture according to the processing result and the processing mode, such that the processing result of the second picture after the processing is the same as the processing result.

Optionally, the method further includes:

storing the processing information in the attribute field of the third picture.

Optionally, storing the processing information in the attribute field of the third picture includes:

adding at least one new subfield to the attribute field of the third picture, and storing the processing information for processing the first picture in the at least one new subfield; or selecting at least one subfield from the attribute field of the third picture, and storing the processing information for processing the first picture in the at least one subfield.

Optionally, the method further includes:

storing a picture identifier of the third picture and the processing information correspondingly in the correspondence between picture identifiers and processing information.

In the example of the present disclosure, a processed first picture and a to-be-processed second picture are acquired; processing information for processing the first picture is acquired; and the second picture is processed according to the processing information to obtain a third picture. Compared with user manually setting processing information, the time required for acquiring the processing information can be reduced, and the efficiency of processing the picture can be improved.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for processing a picture, comprising:
   acquiring, by a terminal, a first picture and a second picture, wherein the first picture is obtained from processing a first original picture by using processing information and the second picture is to be processed;
   acquiring, by the terminal, the processing information from the first picture, wherein the processing information comprises at least a processing mode and a processing parameter; and
   processing, by the terminal, the second picture using the processing information to obtain a third picture;
   wherein acquiring the processing information comprises:
   acquiring, by the terminal, the processing information from a stored correspondence between a picture identifier and the processing information by using the picture identifier of the first picture, wherein the picture identifier of the first picture is acquired according to picture content of the first picture.

2. The method according to claim 1, wherein acquiring the first picture and the second picture comprises:
   acquiring, by the terminal, the first picture and the second picture when detecting that a position between the first picture and the second picture satisfies a preset positional relationship; or
   when a first selection operation on the first picture and a second selection operation on the second picture are detected, acquiring, by the terminal the first picture corresponding to the first selection operation and acquiring the second picture corresponding to the second selection operation.

3. The method according to claim 1, wherein acquiring the first picture and the second picture comprises:
   acquiring from processed pictures stored in a server by the terminal, wherein at least one picture of the processed pictures contains a face image having a face shape comprised in the second picture; and
   selecting one picture from the at least one picture as the first picture.

4. The method according to claim 1, wherein the processing parameter comprises a processing degree for processing the first original picture or a processing result obtained after the first original picture is processed; and
   processing, by the terminal, the second picture using the processing information to obtain the third picture comprises:
   performing a processing operation by the terminal corresponding to the processing mode on the second picture using the processing degree; or
   processing the second picture by the terminal using the processing result and the processing mode such that a second processing result of the second picture after the second picture is processed is the same as the processing result.

5. The method according to claim 1, further comprising: storing, by the terminal, the processing information in an attribute field of the third picture.

6. The method according to of claim 5, wherein storing the processing information in the attribute field of the third picture comprises:
   adding, by the terminal, at least one new subfield to the attribute field of the third picture, and storing the processing information in the at least one new subfield; or
   selecting, by the terminal, at least one subfield from the attribute field of the third picture, and storing the processing information in the at least one subfield.

7. The method according to claim 1, further comprising:
corresponingly storing, by the terminal, a picture identifier of the third picture and the processing information in a correspondence between the picture identifier and the processing information.

8. A device for processing a picture, comprising:
a processor; and
a memory for storing instructions executable by the processor;
wherein the processor is configured to:
acquire a first picture and a second picture, wherein the first picture is obtained from processing a first original picture by using processing information and the second picture is to be processed;
acquire the processing information from the first picture, wherein the processing information comprises at least a processing mode and a processing parameter; and
process the second picture using the processing information to obtain a third picture;
wherein when acquiring the processing information, the processor is further configured to:
acquire the processing information from a stored correspondence between a picture identifier and the processing information by using the picture identifier of the first picture, wherein the picture identifier of the first picture is acquired according to picture content of the first picture.

9. The device according to claim 8, wherein the processor configured to acquire the first picture and the second picture is further configured to:
acquire the first picture and the second picture when detecting that a position between the first picture and the second picture satisfies a preset positional relationship; or
when a first selection operation on the first picture and a second selection operation on the second picture are detected, acquire the first picture corresponding to the first selection operation and acquire the second picture corresponding to the second selection operation.

10. The device according to claim 8, wherein the processor configured to acquire the first picture and the second picture is further configured to:
acquire from processed pictures stored in a server, wherein at least one picture of the processed pictures contains a face image having a face shape comprised in the second picture; and
select one picture from the at least one picture as the first picture.

11. The device according to claim 8, wherein the processing parameter comprises a processing degree for processing the first original picture or a processing result obtained after the first original picture is processed; and
the processor configured to process the second picture using the processing information to obtain the third picture is further configured to:
perform a processing operation corresponding to the processing mode on the second picture using the processing degree; or
process the second picture using the processing result and the processing mode, such that a second processing result of the second picture is the same as the processing result.

12. The device according to claim 8, wherein the processor is further configured to: store the processing information in an attribute field of the third picture.

13. The device according to claim 12, wherein the processor configured to store the processing information in the attribute field of the third picture is further configured to:
add at least one new subfield to the attribute field of the third picture, and store the processing information in the at least one new subfield; or
select at least one subfield from the attribute field of the third picture, and store the processing information in the at least one subfield.

14. The device according to claim 8, wherein the processor is further configured to:
correspondingly store a picture identifier of the third picture and the processing information in a correspondence between the picture identifier and the processing information.

15. A non-transitory computer readable storage medium having stored thereon instructions, when the instructions are executed by a device, enable the device to perform:
acquiring a first picture and a second picture, wherein the first picture is obtained from processing a first original picture by using processing information and the second picture is to be processed;
acquiring the processing information from the first picture, wherein the processing information comprises at least a processing mode and a processing parameter; and
processing the second picture using the processing information to obtain a third picture;
wherein acquiring the processing information comprises:
acquiring the processing information from a stored correspondence between a picture identifier and the processing information by using the picture identifier of the first picture, wherein the picture identifier of the first picture is acquired according to picture content of the first picture.

16. The storage medium according to claim 15, wherein the instructions that enable the device to perform acquiring the first picture and the second picture further enable the device to perform:
acquiring the first picture and the second picture when detecting that a position between the first picture and the second picture satisfies a preset positional relationship; or
when a first selection operation on the first picture and a second selection operation on the second picture are detected, acquiring the first picture corresponding to the first selection operation and acquiring the second picture corresponding to the second selection operation.

17. The storage medium according to claim 15, wherein the instructions that enable the device to perform acquiring the first picture and the second picture further enable the device to perform:
acquiring from processed pictures stored in a server, wherein at least one picture of the processed pictures contains a face image having a face shape comprised in the second picture; and
selecting one picture from the at least one picture as the first picture.

* * * * *